June 20, 1961  G. A. LYON  2,989,346
WHEEL COVER
Filed Sept. 11, 1956  3 Sheets-Sheet 1
Fig. 3
Fig. 1
Fig. 2
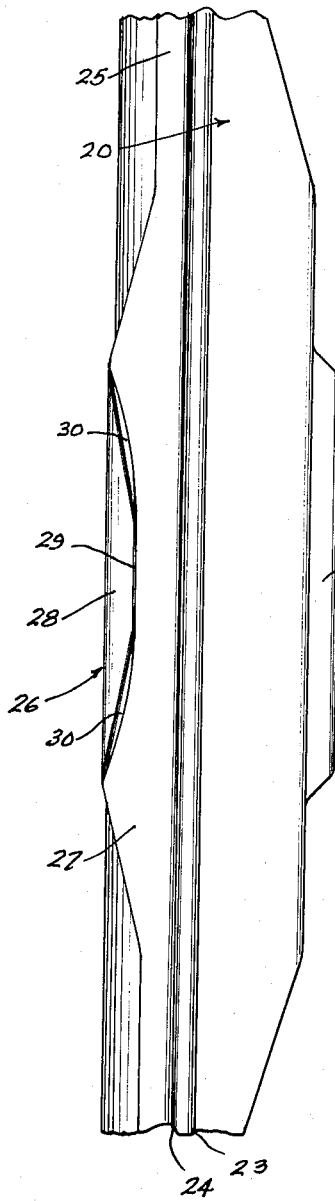
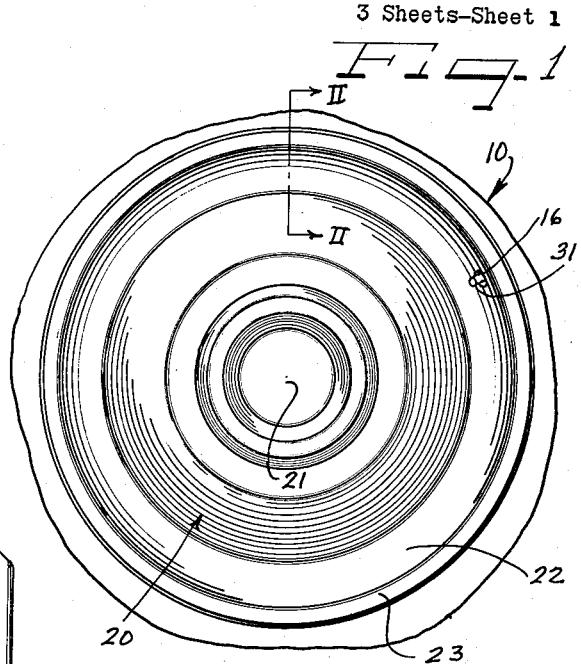
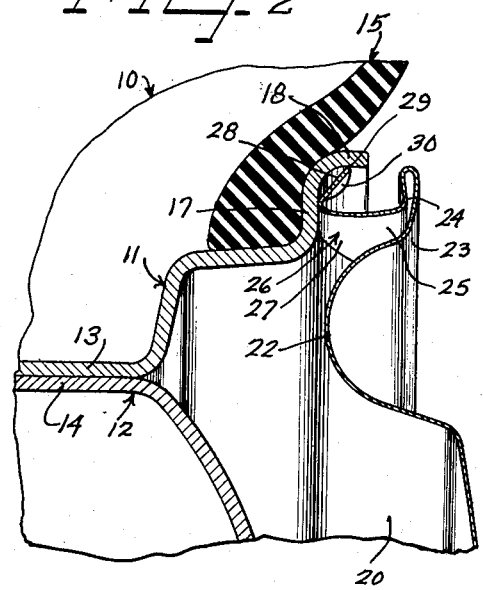
Inventor
George Albert Lyon June 20, 1961 G. A. LYON 2,989,346
WHEEL COVER
Filed Sept. 11, 1956 3 Sheets-Sheet 2

Inventor
George Albert Lyon

June 20, 1961  G. A. LYON  2,989,346
WHEEL COVER
Filed Sept. 11, 1956  3 Sheets-Sheet 3
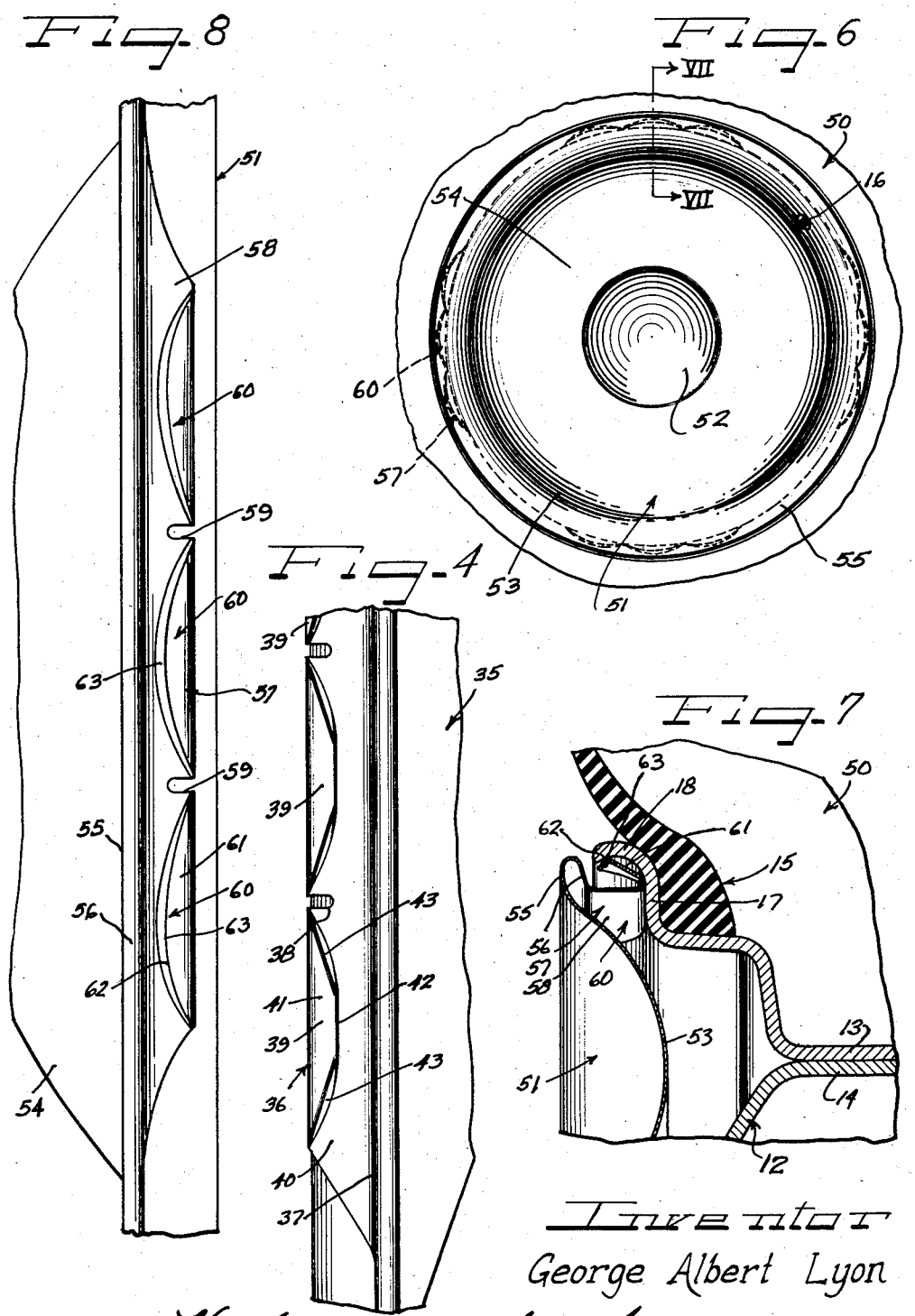
Inventor
George Albert Lyon

United States Patent Office 2,989,346
Patented June 20, 1961

2,989,346
WHEEL COVER
George Albert Lyon, 13881 W. Chicago Blvd.
Detroit, Mich.
Filed Sept. 11, 1956, Ser. No. 609,140
1 Claim. (Cl. 301—37)

This invention relates generally to wheel structures and more particularly to new and improved means for detachably retaining an ornamental cover member in protective overlying relation upon a vehicle wheel.

In an automobile industry there is presently existing a demand upon wheel cover manufacturers to reduce their production cost without sacrificing modern design and styling of the cover members. To this end, I have found it highly desirable to utilize the four corners of the blanks of the wheel covers in providing retaining means for the cover members. The illustrated cover members are of the full disk type and adapted to completely overlie the rim and body parts and have the four corners turned under into retaining fingers for retaining cooperation with the tire rim. The present invention contemplates turning under edge portions of the short stiff terminal legs of the retaining fingers in order to reinforce them so that they may effectively retainingly cooperate with the vehicle wheel.

Accordingly, an object of this invention is to provide a new and improved retaining action between a wheel cover member and a vehicle wheel.

A more specific object of this invention is to provide preferably four circumferentially spaced wide finger extensions with each of the extensions having a short stiff returned bent reinforced terminal.

A further specific object of this invention is to provide a wheel cover member with four circumferentially spaced resilient fingers and a cover member with each of the fingers divided up into two or more sub-fingers and with the sub-fingers having their terminals returned bent and reinforced.

Another object of this invention is to provide a cover member having any one of the aforementioned types of fingers and being adapted to optionally have or not have a continuous annular axial flange interposed between the fingers and the cover.

According to the general features of this invention there is provided a wheel structure with a wheel having rim and body parts including an axial wheel portion. In overlying retained disposition upon the wheel is a cover section having circumferentially spaced sets of resilient deflectable fingers with the fingers including intermediate and side sub-fingers and with the fingers being arranged in a common circle having a diameter slightly at variance with the axial wheel portion for tensioned engagement therewith. Each of the sub-fingers has an elongated relatively flexible leg portion and a returned bent short stiff terminal, the terminals having edge portions turned under extending generally toward the elongated leg portions to stiffen the finger extensions and enhance their gripping characteristics.

Another object of this invention relates to providing the aforementioned wheel structure with circumferentially spaced wide fingers in place of the aforementioned type of fingers and with the wide fingers each having a short stiff terminal, the terminals having edge portions turned under extending generally toward the elongated leg portions to stiffen the finger extensions and enhance their gripping characteristics.

Yet another object of this invention is to provide a wheel cover member which lends itself to economical manufacture and a large production basis.

Other objects and features of the present invention will more fully become apparent in view of the following detailed description taken in conjunction with the accompanying drawings illustrating therein some representative forms of my invention and in which:

FIGURE 1 is a side elevation of my novel wheel cover member in assembly upon a vehicle wheel;

FIGURE 2 is an enlarged fragmentary cross-sectional view taken substantially on the line II—II of FIGURE 1 looking in the direction indicated by the arrows;

FIGURE 3 is an enlarged fragmentary edge elevation of my cover member;

FIGURE 4 is an edge elevation similar to FIGURE 3 only showing a modified finger and cover construction;

FIGURE 6 is a fragmentary side elevation of still another modified form of my invention;

FIGURE 7 is an enlarged fragmentary cross-sectional view taken substantially on the line VII—VII of FIGURE 6 looking in the direction indicated by the arrow;

FIGURE 8 is a enlarged fragmentary edge elevation of the cover shown in FIGURES 6 and 7.

As shown on the drawings:

Figure 9:
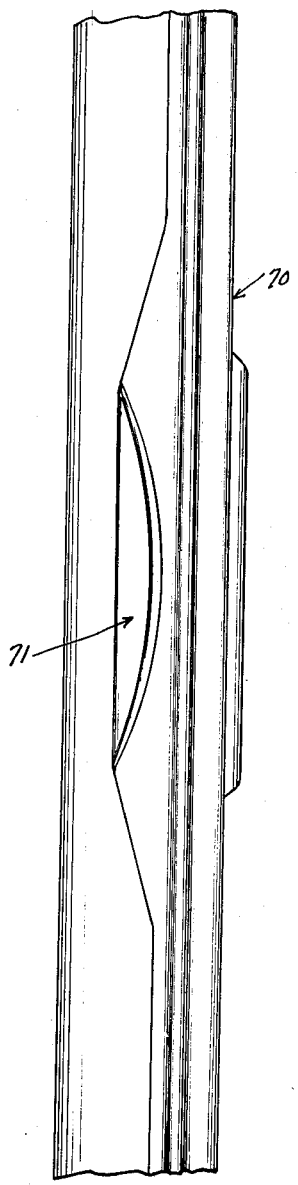
FIGURE 9 is a fragmentary enlarged edge elevation of still another modified form of my invention.

The first form of my invention is shown in FIGURES 1–3 wherein the wheel structure is indicated generally by the reference numeral 10. The wheel includes a multi-flanged drop center type of tire rim 11 which is suitably connected to a body part 12. The tire rim 11 includes a base flange 13 and the body part includes an attachment flange 14 with the flanges 13 and 14 being suitably connected together such as by means of welding and the like.

Carried upon the wheel is a conventional tire assembly 15 which may be either of the tube or tubeless type and is adapted to be inflated by inserting air through valve stem 16.

In the assembly of the wheel structure 10 upon a vehicle wheel and the like, lugs on the vehicle axis (not shown) may be clamped to the wheel by threading nuts onto the lugs.

As is shown in FIGURE 2, the tire rim includes a radial flange 17 and a terminal flange 18 having a substantially cylindrical radially inwardly facing face which is illustrated as having a 3° inboard taper. If desired, the terminal flange could have a different configuration, however, this type is believed to be highly desirable since it does not interfere with the tire.

Carried on the wheel in overlying protective retained disposition is my ornamental cover member 20. The cover member 20 in the illustrated embodiment is a full disk cover and may be manufactured with excellent results from spring stainless steel. The cover member 20 has an enlarged central crown portion 21. Disposed radially outwardly of the crown portion 21 is a dished cover portion 22 which in turn is connected at its radially outer side to cover margin 23.

The margin 23 is turned under to provide a continuous annular generally radially inwardly extending flange cover portion 24 which is in underlying spaced relation to the margin 23. Connected to the radial flange portion 24 is a continuous annular generally axially inwardly extending axial stiffening flange 25.

For reasons of economy, the cover 20 may be made from a square blank with the corners thereof turned under during the formation of the cover to provide four equidistantly spaced fingers 26 which are connected to the axially inner end of the flange 25.

Each of the finger extensions 26 includes a circumferentially elongated axial flange portion 27 which is tapered in such a manner that the widest portion of the flange portion 27 is at its juncture with the axial flange portion 25. Connected at the axially inner end of the circumferentially and axially elongated flange portion 27 is a returned bent short stiff terminal 28 which is also elongated in a circumferential direction. The short stiff terminal 28 terminates in a gripping edge 29 which is adapted to retainingly cooperate with the terminal rim flange 18 when the cover is pressed onto the wheel.

According to this invention, the short stiff terminal leg portion has been stiffened by providing generally radially inwardly axially outwardly extending turned wings 30 which extend generally towards the axial finger portion 27.

To assemble the cover on the wheel, cover opening 31 is initially aligned with respect to the valve stem 16 and the cover is thereafter pressed against the wheel with the finger edges 29 tentatively engaged against and thereafter resiliently deflected into retaining engagement with the terminal tire rim flange 18. The cover may be removed from the wheel by inserting a pry-off tool underneath the radial cover flange 24 and upon the application of a pry-off force the cover may be ejected from the wheel. Since each of the fingers 26 is resiliently deflectable the cover may be attached and removed without harmfully affecting the fingers 27.

The aforementioned type of finger construction is highly advantageous since under test it has been found to very effectively retainingly cooperate with a vehicle wheel. By stiffening the short stiff terminal leg portion 28 by means of the wings or underturned portions 30 the axial finger portion 27 is caused to deflect to a greater degree and to cause the edge 29 to more effectively bite into the terminal rim flange 18.

In FIGURE 4 is shown a modified form of my invention wherein cover 35 has circumferentially spaced sets of fingers 36 secured directly to the underturned radial cover portion 37. Each of the fingers 36 is divided up by means of notches 38 into sub-fingers 39. The circumferentially spaced side sub-fingers 39 is widest at its junction with the cover in order to stiffen the same.

The particular construction of each of the sub-fingers 39 is illustrated as being substantially the same as the fingers 26 in the first form of my invention. To summarize, the sub-fingers include a resiliently deflectable axially elongated finger portion 40 which is connected at its axially inner end to a short stiff returned bent terminal flange 41. The terminal flange 41 has a gripping edge 42 with turned under wings or stiffening portions 43 and circumferentially opposite sides thereof.

The assembly and detachment of the cover 35 from a vehicle wheel will operate in much the same manner as in the first form of my invention.

Figure 5:
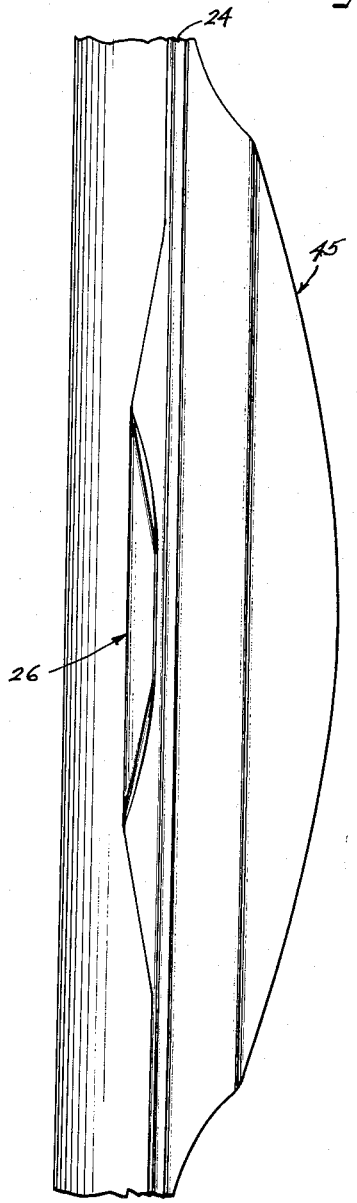
FIGURE 5 is an enlarged fragmentary edge elevation similar to FIGURE 3 illustrating a still further modified construction.

The modified cover 45 of FIGURE 5 is very substantially like the cover shown in FIGURE 3 with the exception that the annular axial flange portion 25 has been omitted and the fingers 26 have been connected directly to cover portion 24.

FIGURES 6–8 show a further modified type of wheel structure indicated generally by the reference numeral 50 since the rim and body part construction is the same as that shown in FIGURE 2, the same reference numerals have been used in connection to identify identical elements.

Disposed in overlying relation upon the wheel is my cover member 51 which is again shown as being a full disk type of cover.

The cover has a central crown 52 separated from an intermediate dished portion 53 by an annular rib 54. Disposed radially outwardly of the rib 54 and dished portion 53 is the outer cover margin 55. Here again, it will be noted, the cover is adapted to substantially overlie and conceal both the tire rim and body parts. The cover margin 55 is underturned to provide a generally radially inwardly extending cover portion 56 to which is connected at circumferentially spaced intervals resiliently deflectable finger extensions 57.

Each of the finger extensions 57 is preferably formed from the material at one of the corners of the blank from which the cover is formed to keep costs to a minimum. For purposes of rendering the finger extensions 57 more resilient, each of them is preferably widest at the place where it is connected to the radial cover portion 56 and tapered inwardly from the base.

The extensions 57 include axially elongated resilient axial leg portions 58. To increase the gripping capacity of the finger extensions 57, each of them is preferably notched at circumferentially spaced intervals at 59 to divide the extensions 57 into a plurality of sub-finger 60.

The sub-fingers 60 each include a portion of the axial finger portion 58 and terminate in a returned bent short stiff terminal flange portion 61. According to this invention, the tip of the short stiff leg portion 61 which is turned under to provide a continuous arcuate reinforcing flange 62 which extends generally radially inwardly and axially outwardly. At the junction of the finger portions 61 and 62 is provided a gripping edge 63 which is adapted to bite into the terminal rim flange 18.

The cover 51 may be assembled and removed from the wheel in much the same manner as described in connection with the first form of my invention.

In FIGURE 9 is shown still another modified wheel cover 70 which is very similar to the wheel cover shown in FIGURE 3. This form of my invention differs from the other forms in that I have provided a circumferentially widened finger extension 71 which is of a similar construction to the sub-fingers 60 shown in FIGURE 8.

In all forms of my invention when the cover is in assembly with the wheel the fingers are adapted to be bottomed against the rim flange 17 with their gripping edges in biting engagement with the terminal rim flange 18 in order to increase the resilient deflectability of the finger particularly the axial finger portion. Each of the fingers has been reinforced by turning under in a generally radially inwardly axially outwardly direction the tips of the relatively short finger portions. By this construction, when the cover is in assembly upon the wheel, the short stiff terminals are bottomed against the tire rim and extend in an inclined direction into biting engagement with the terminal rim flange to very effectively grip the wheel to hold the cover in assembly therewith.

It will be understood that modifications and variations may be effected without departing from the scope of the novel concepts of the present invention.

I claim as my invention:

In a wheel structure including a wheel body and a tire rim having an outer side generally radially extending and axially outwardly facing flange portion from which extends generally axially outwardly a terminal flange portion having a generally radially inwardly facing surface, a cover for disposition at the outer side of the wheel and having an outer marginal portion of a diameter to overlie the tire rim radially extending flange, said marginal portion having extending axially inwardly therefrom a circumferential series of cover retaining fingers extending toward said radially extending rim flange and spaced radially inwardly from the axially extending terminal flange, each of said fingers having a short and stiff terminal flange extending generally radially and axially outwardly and having a gripping edge for biting engagement with said radially inwardly facing surface of the axially extending rim terminal flange, each of said finger terminal flanges having at each of the circumferential sides thereof throughout substantially its length respective generally radially inwardly turned stiffening reinforcing wings.

(References on following page)

References Cited in the file of this patent

UNITED STATES PATENTS

| | | |
|---|---|---|
| Re. 24,229 | Lyon | Oct. 23, 1956 |
| 2,006,747 | Ritz-woller | July 2, 1935 |
| 2,624,627 | Lyon | Jan. 6, 1953 |
| 2,683,628 | Lyon | July 13, 1954 |
| 2,707,449 | Lyon | May 3, 1955 |

FOREIGN PATENTS

| | | |
|---|---|---|
| 360,204 | Great Britain | Nov. 5, 1931 |
| 1,124,746 | France | July 2, 1956 |

(Corresponding U.S. Patent 2,870,879, Jan. 27, 1959.)